(12) United States Patent
De et al.

(10) Patent No.: US 11,098,570 B2
(45) Date of Patent: Aug. 24, 2021

(54) SYSTEM AND METHOD FOR A CENTRIFUGAL DOWNHOLE OIL-WATER SEPARATOR

(71) Applicant: General Electric Company, Schenectady, NY (US)

(72) Inventors: Anindya Kanti De, Karnataka (IN); Subrata Pal, Karnataka (IN); Shyam Sivaramakrishnan, Edmond, OK (US)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 34 days.

(21) Appl. No.: 15/476,406

(22) Filed: Mar. 31, 2017

(65) Prior Publication Data

US 2018/0283154 A1    Oct. 4, 2018

(51) Int. Cl.
*E21B 43/38* (2006.01)
*E21B 43/12* (2006.01)
*B01D 17/02* (2006.01)
*B01D 17/12* (2006.01)

(52) U.S. Cl.
CPC .......... *E21B 43/38* (2013.01); *B01D 17/0217* (2013.01); *B01D 17/12* (2013.01); *E21B 43/127* (2013.01)

(58) Field of Classification Search
CPC .. E21B 43/38; E21B 43/127; E21B 2043/125; B01D 17/12; B01D 17/0217
See application file for complete search history.

(56) References Cited

U.S. PATENT DOCUMENTS

| 4,622,150 A | 11/1986 | Carroll |
| 4,846,780 A | 7/1989 | Galloway et al. |
| 4,927,536 A | 5/1990 | Worrell et al. |

(Continued)

FOREIGN PATENT DOCUMENTS

| EP | 0984134 A2 | 3/2000 |
| EP | 1 191 185 B1 | 3/2004 |

(Continued)

OTHER PUBLICATIONS

Mohamed Hossnihashem., "Development of Centrifugal Downhole Oil/Water Separator: Simulation and Experimental Study", SPE Annual Technical Conference and Exhibition, Dubai, UAE, Sep. 2016.

(Continued)

*Primary Examiner* — Brad Harcourt
(74) *Attorney, Agent, or Firm* — Crowe & Dunlevy, P.C.

(57) ABSTRACT

A centrifugal separator includes an outer tube, an inner tube, an outlet pipe, and a control mechanism. The outer tube defines at least one outer tube inlet and at least one outer tube outlet. The inner tube is disposed within the outer tube. The inner tube is configured to separate the flow of a first fluid into the flow of a second fluid and a flow of a third fluid by rotation thereof. The outlet pipe is partially disposed within the inner tube and the outer tube. The outlet pipe includes a cross-sectional area. The outlet pipe is configured to channel the flow of the third fluid out of the inner tube and the outer tube. The control mechanism is coupled to the outlet pipe. The control mechanism is configured to regulate the flow of the third fluid by changing the cross-sectional area of the outlet pipe.

17 Claims, 5 Drawing Sheets

(56) References Cited

U.S. PATENT DOCUMENTS

| | | | |
|---|---|---|---|
| 5,209,765 | A | 5/1993 | Kolpak et al. |
| 5,456,837 | A | 10/1995 | Peachey |
| 5,698,014 | A | 12/1997 | Cadle et al. |
| 6,325,143 | B1 | 12/2001 | Scarsdale |
| 6,336,503 | B1 | 1/2002 | Alhanati et al. |
| 6,346,069 | B1 | 2/2002 | Collier |
| 6,378,608 | B1 | 4/2002 | Nilsen et al. |
| 6,457,522 | B1 | 10/2002 | Bangash et al. |
| 6,457,531 | B1 | 10/2002 | Bangash et al. |
| 6,547,003 | B1 | 4/2003 | Bangash et al. |
| 6,550,535 | B1 | 4/2003 | Traylor |
| 6,691,782 | B2 | 2/2004 | Vandevier |
| 7,520,989 | B2 | 4/2009 | Destergaard |
| 7,686,086 | B2 | 3/2010 | Brammer |
| 8,080,157 | B2 | 12/2011 | Fenton |
| 8,211,284 | B2 | 7/2012 | Hamid et al. |
| 8,327,941 | B2 | 12/2012 | Hackworth |
| 8,425,670 | B2 | 4/2013 | Carlsson et al. |
| 8,757,256 | B2 | 6/2014 | Li et al. |
| 2002/0178924 | A1 * | 12/2002 | Brown ............... B01D 19/0052 96/214 |
| 2005/0087336 | A1 * | 4/2005 | Surjaatmadja .......... E21B 43/38 166/105.5 |
| 2008/0236821 | A1 | 10/2008 | Fielder |
| 2009/0056939 | A1 | 3/2009 | Hackworth et al. |

FOREIGN PATENT DOCUMENTS

| | | |
|---|---|---|
| WO | 98054441 A2 | 12/1998 |
| WO | 2006010765 A1 | 2/2006 |

OTHER PUBLICATIONS

Uktadir et al., "Review and Applicability of Downhole Separation Technology", SPE Middle East Artificial Lift Conference and Exhibition, Manama, 2016.

International Search Report and Written Opinion issued in connection with corresponding PCT Application No. PCT/US2018/025391 dated Aug. 1, 2018.

* cited by examiner

SYSTEM AND METHOD FOR A CENTRIFUGAL DOWNHOLE OIL-WATER SEPARATOR

BACKGROUND

The field of the invention relates generally to oil and gas well separation systems and, more specifically, to a centrifugal downhole oil-water separator.

At least some known oil and gas wells produce a variety of produced fluids including oil, gas, and water. The content of the produced fluid typically changes over time. At least some oil and gas wells separate the produced fluids at the surface of the well before the produced fluids are sent to a facility for further processing. However, at least some oil and gas wells separate the produced fluids at downhole within the well before sending the produced fluids to the surface. Separating the produced fluids at the surface, rather than downhole within the well, typically requires larger, more expensive equipment and more energy than separating the produced fluids downhole within the well. However, typical downhole separation systems do not adequately control the separation process downhole. That is, typical downhole separation systems have a narrow operating range and do not adequately adapt to changing content.

BRIEF DESCRIPTION

In one aspect, a centrifugal separator is provided. The centrifugal separator includes an outer tube, an inner tube, an outlet pipe, and a control mechanism. The outer tube defines at least one outer tube inlet for a first fluid and an outer tube outlet for a second fluid. The at least one outer tube inlet is configured to channel a flow of the first fluid into the outer tube. The outer tube outlet is configured to channel a flow of the second fluid out of the outer tube. The inner tube is disposed within the outer tube such that the outer tube circumscribes the inner tube. The inner tube is configured to separate the flow of the first fluid into the flow of the second fluid and a flow of a third fluid by rotation thereof. The outlet pipe is partially disposed within the inner tube and the outer tube such that the inner tube and the outer tube partially circumscribe the outlet pipe. The outlet pipe includes a cross-sectional area. The outlet pipe is configured to channel the flow of the third fluid out of the inner tube and the outer tube. The control mechanism is coupled to the outlet pipe. The control mechanism is configured to regulate the flow of the third fluid by changing the cross-sectional area of the outlet pipe.

In a further aspect, a pumping system is provided. The pumping system includes a pump and a centrifugal separator. The pump is configured to induce a flow of a first fluid out of a well bore. The centrifugal separator is coupled in flow communication with the pump. The centrifugal separator includes an outer tube, an inner tube, an outlet pipe, and a control mechanism. The outer tube defines at least one outer tube inlet for a first fluid and an outer tube outlet for a second fluid. The at least one outer tube inlet is configured to channel a flow of the first fluid into the outer tube. The outer tube outlet configured to channel a flow of the second fluid out of the outer tube. The inner tube is disposed within the outer tube such that the outer tube circumscribes the inner tube. The inner tube is configured to separate the flow of the first fluid into the flow of the second fluid and a flow of a third fluid by rotation thereof. The outlet pipe is partially disposed within the inner tube and the outer tube such that the inner tube and the outer tube partially circumscribe the outlet pipe. The outlet pipe includes a cross-sectional area. The outlet pipe is configured to channel the flow of the third fluid out of the inner tube and the outer tube. The control mechanism is coupled to the outlet pipe. The control mechanism is configured to regulate the flow of the third fluid by changing the cross-sectional area of the outlet pipe.

In another aspect, a method of controlling a centrifugal separator is provided. The centrifugal separator includes an outer tube, an inner tube, an outlet pipe, and a control mechanism. The inner tube disposed within the outer tube. The outer tube defines an outer tube outlet. The inner tube is configured to separate a flow of a first fluid into a flow of a second fluid and a flow of a third fluid by rotating. The outlet pipe includes a cross-sectional area. The outlet pipe is configured to channel the flow of third out of the inner tube and the outer tube. The control mechanism is coupled to the outlet pipe. The method includes receiving the flow of the first fluid by the inner tube. The method also includes rotating the inner tube to separate the flow of the first fluid into the flow of the second fluid and a flow of the third fluid. The method further includes channeling the flow of the second fluid into the outer tube outlet. The method also includes channeling the flow of the third fluid into the outlet pipe. The method further includes changing the cross-sectional area of the outlet pipe with the control mechanism. Changing the cross-sectional area of the outlet pipe regulates the flow of the third fluid into the outlet pipe.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a longitudinal axis of the centrifugal separator. Moreover, the terms "radial" and "radially" refer to directions and orientations that extend substantially perpendicular to the longitudinal axis of the centrifugal separator. In addition, as used herein, the terms "circumferential" and "circumferentially" refer to directions and orientations that extend arcuately about the longitudinal axis of the centrifugal separator.

Embodiments of the present disclosure relate to a centrifugal separator having improved separation control. More specifically, the centrifugal separator includes an outer tube, an inner tube, an outlet pipe, a motor, and a control mechanism. The outer tube circumscribes the inner tube. The outer tube and the inner tube both partially circumscribe the outlet pipe. The control mechanism is coupled to the outlet pipe. In the exemplary embodiment, the control mechanism is a plurality of springs that change the cross-sectional area of an inlet of the outlet pipe to control the separation of the centrifugal separator. The motor is configured to rotate the inner tube within the outer tube. In operation, a mixed stream of at least a high-density fluid and a low-density fluid is channeled within the centrifugal separator. As the inner tube rotates, the high-density fluid is forced radially outwards within the inner tube and the low-density fluid is forced radially inwards within the inner tube. The outlet pipe channels the low-density fluid out of the centrifugal separator. As the ratio of high-density fluid to low-density fluid within the mixed stream changes, the relative pressures of the high-density fluid and low-density fluid also change. That is, as the amount of low-density fluid within the mixed stream decreases, so does the pressure of the low-density fluid within the outlet pipe. As the pressure of the low-density fluid within the outlet pipe decreases, the springs reduce the cross-sectional area of the outlet pipe, which reduces the amount of low-density fluid that is channeled out of the centrifugal separator. As such, the centrifugal separator described herein includes a control mechanism that automatically responds to changing composition of a mixed stream and improves the separation control of the centrifugal separator.

Figure 1:
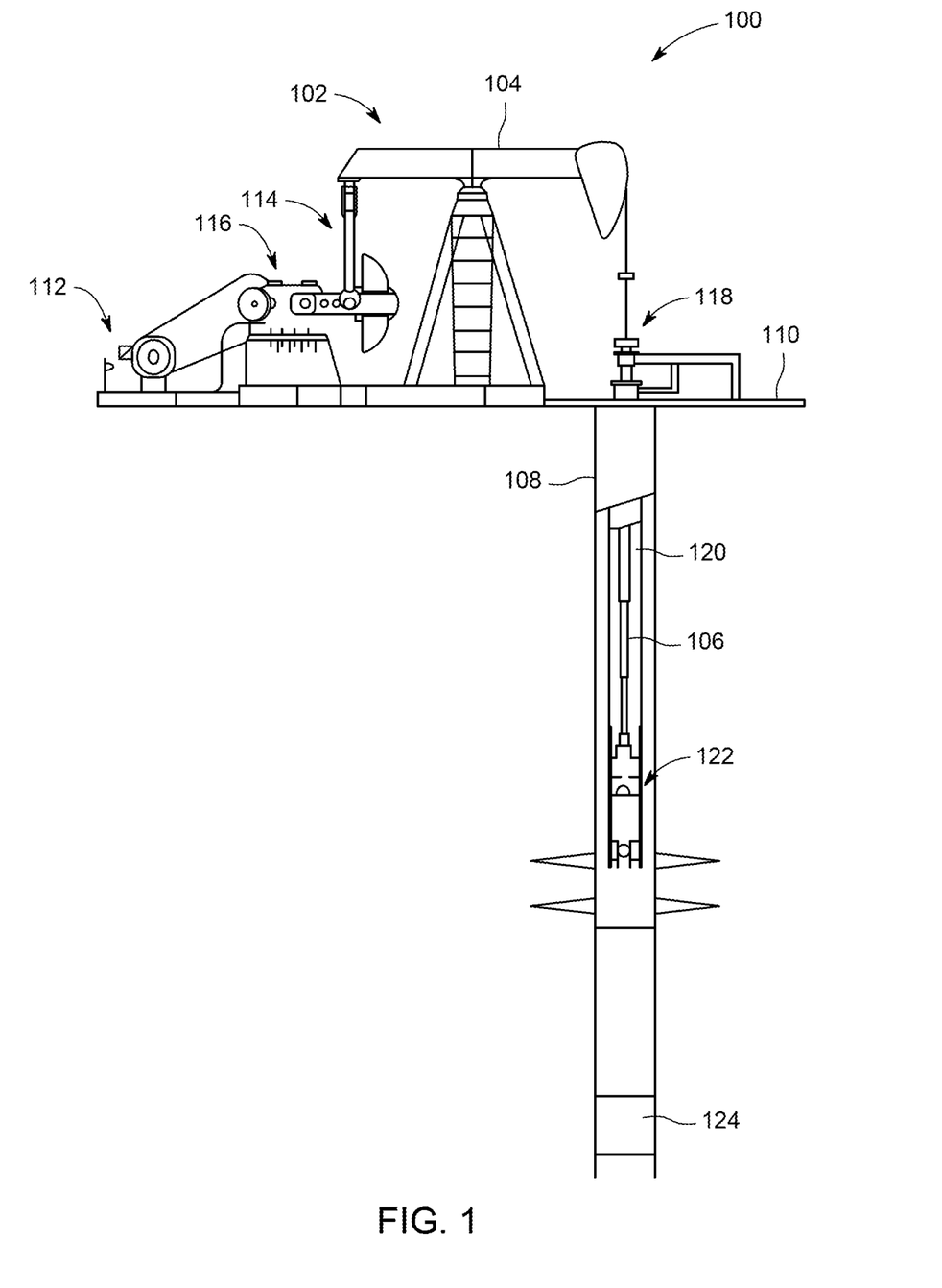
FIG. 1 is a schematic view of an exemplary rod pump system.

FIG. 1 is a schematic view of an exemplary rod pump system 100. In the exemplary embodiment, pump system 100 includes a beam pump 102 with a beam 104 coupled to a polished rod string 106 adjacent a well bore 108. Well bore 108 is drilled through a surface 110 to facilitate the extraction of production fluids including, but not limited to, petroleum fluids and water, with and without hard particles. As used herein, petroleum fluids refer to mineral hydrocarbon substances such as crude oil, gas, and combinations thereof.

Beam pump 102 is actuated by a prime mover 112, such as an electric motor, coupled to a crank arm 114 through a gear reducer 116, such as a gearbox. Gear reducer 116 converts torque produced by prime mover 112 to a low speed but high torque output suitable for driving the pumping oscillation of crank arm 114. Crank arm 114 is coupled to beam 104 such that rod string 106 reciprocates within well bore 108 during operation. In alternative embodiments, beam pump 102 is any suitable pump that facilitates reciprocating rod string 106 as described herein. Pump system 100 further includes a well head 118, production tubing 120 coupled to well head 118, and a downhole pump 122 disposed at the bottom of well bore 108. Rod string 106 is coupled to downhole pump 122 such that production fluids are lifted towards surface 110 upon each upswing of rod string 106. A centrifugal separator 124 is positioned at the bottom of bottom of well bore 108. Centrifugal separator 124 is configured to separate productions fluids before they are pumped to surface 110. Pump system 100 is illustrated as a beam pump system. However, pump system 100 also includes other pump systems including, without limitation, electrical submersible pumps (ESP).

Figure 2:
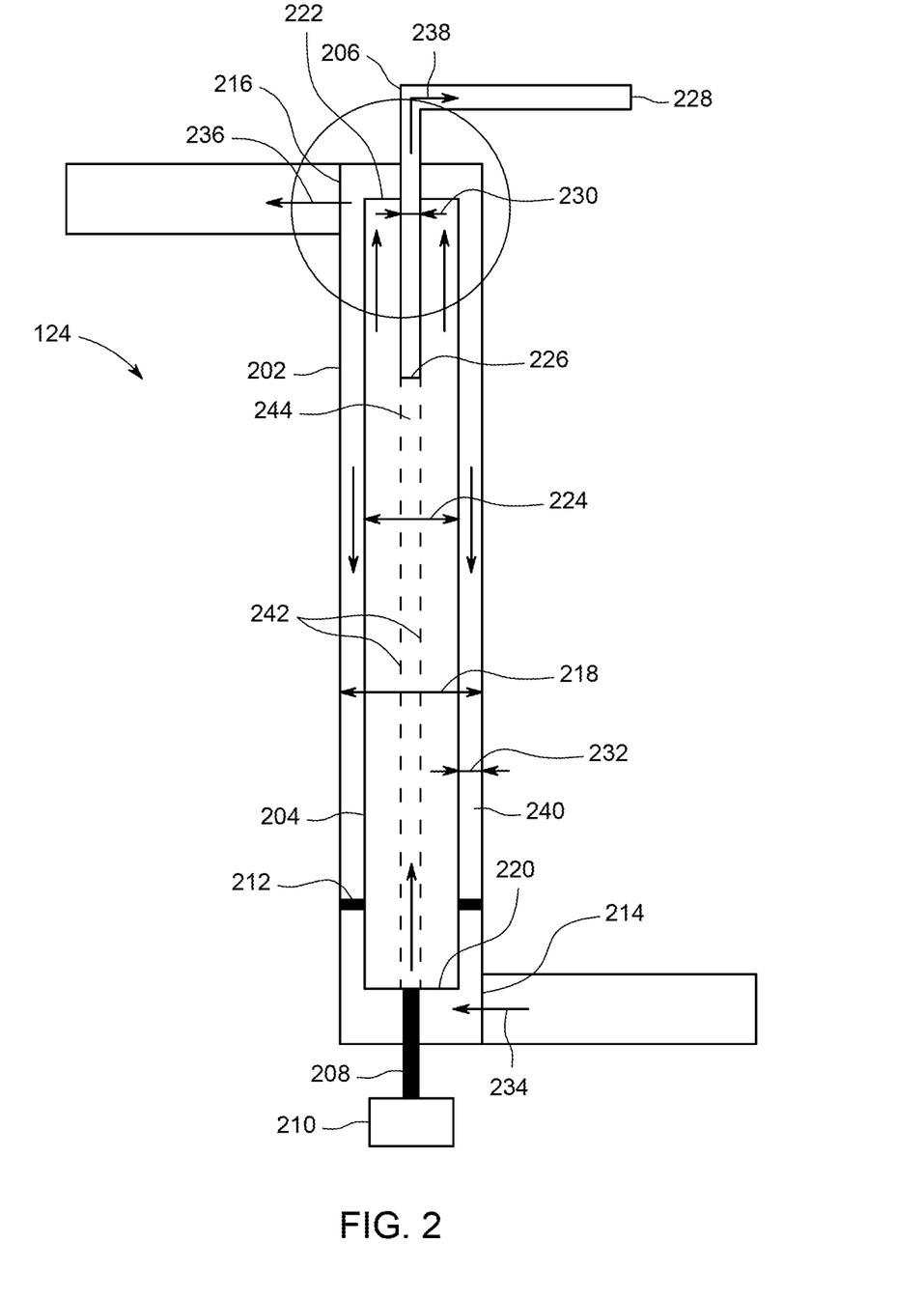
FIG. 2 is a schematic view of centrifugal downhole oil-water separation system for use within a well bore shown in FIG. 1.
Figure 3:
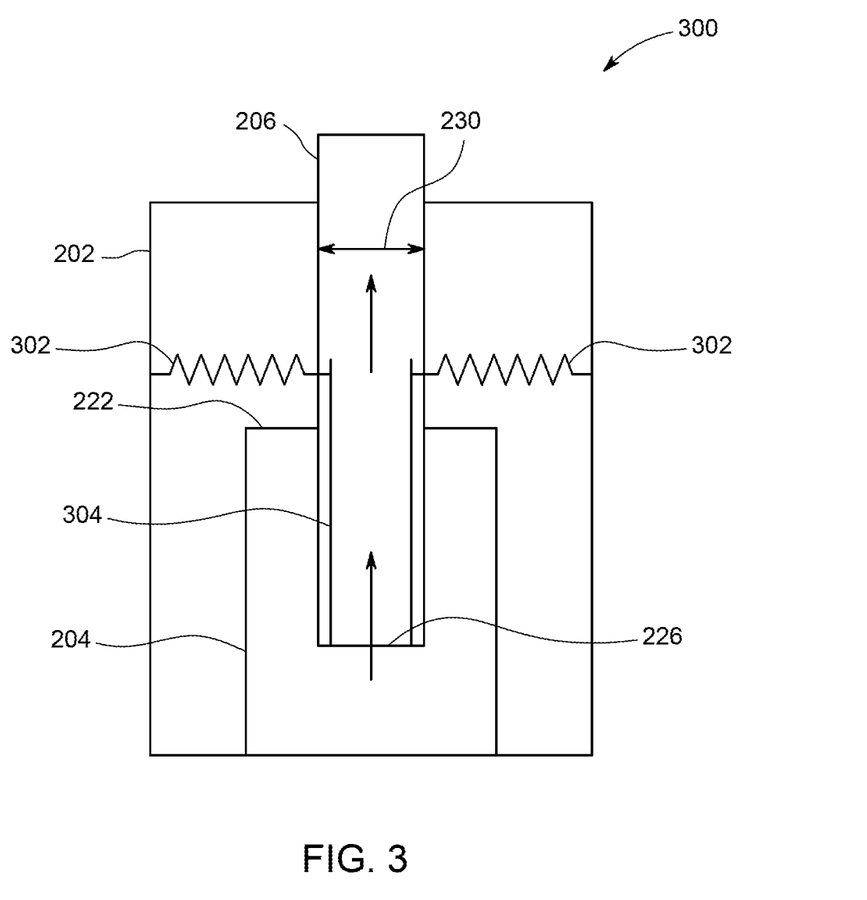
FIG. 3 is a schematic view of a control mechanism of the centrifugal downhole oil-water separation system shown in FIG. 2.

FIG. 2 is a schematic view of an exemplary centrifugal separator 124 that may be used with rod pump system 100 (shown in FIG. 1), and FIG. 3 is a schematic view of an exemplary control mechanism 300 that may be used with centrifugal separator 124. In the exemplary embodiment, centrifugal separator 124 includes an outer tube 202, an inner tube 204, an outlet pipe 206, a shaft 208, a motor 210, and a production fluid diverter 212. In the exemplary embodiment, outer tube 202 is a hollow cylindrical tube and inner tube 204 is a hollow cylindrical tube. Outer tube 202 includes an outer tube inlet 214, an outer tube outlet 216, and an outer tube diameter 218. Inner tube 204 includes an inner tube inlet 220, an inner tube outlet 222, and an inner tube diameter 224. Outlet pipe 206 includes an outlet pipe inlet 226, an outlet pipe outlet 228, and an outlet pipe diameter 230.

Inner tube diameter 224 is smaller than outer tube diameter 218 such that inner tube 204 is positioned within, and circumscribed by outer tube 202. Outer tube 202 and inner tube 204 define an outer conduit 232 therebetween. Production fluid diverter 212 is positioned within outer conduit 232 and circumscribes inner tube 204. Outlet pipe 206 is partially positioned within, and circumscribed by outer tube 202 and inner tube 204. Outlet pipe 206 extends out of outer tube outlet 216 and inner tube outlet 222. Shaft 208 is rotatably coupled to inner tube 204 and motor 210. In one embodiment, outer tube diameter 218 is in a range between and including about 4 inches (in.) and about 6 in., and inner tube diameter 224 is in a range between and including about 3.75 in. and about 5.75 in. In addition, outlet pipe diameter 230 approximately 2 in. Alternatively, outer tube diameter 218, inner tube diameter 224, and outlet pipe diameter 230 are any diameter that enables centrifugal separator 124 to operate as described herein.

In operation, as will be explained in more detail below, outer tube inlet 214 receives a mixed stream or first fluid 234 of at least a second fluid and a third fluid. Mixed stream 234 is separated within centrifugal separator 124 such that a purified stream 236 of second fluid is discharged from outer tube outlet 216, and a purified stream 238 of the third fluid is discharged from outlet pipe outlet 228. In the exemplary embodiment, mixed stream 234 includes a mixture of produced fluids from an oil well including, without limitation, oil, water, and natural gas. In the exemplary embodiment, mixed stream 234 includes 90% water and 10% oil. Alternatively, the water can vary in a range between and including about 70% and about 99%, while the oil can vary in a range between and including about 1% and about 30%. However, in other embodiment, mixed stream 234 includes any amount of oil, water, and natural gas that enables centrifugal separator 124 to operate as described herein.

In the exemplary embodiment, centrifugal separator 124 further includes motor 210 coupled to shaft 208. Motor 210 is operable to cause rotation of inner tube 204 relative to outer tube 202. For example, in some embodiments, inner tube 204 rotates at a speed of less than about 4000 rotations per minute to facilitate separating the second fluid and the third fluid. In addition, motor 210 enables centrifugal separator 124 to be independently operable from other components in pump system 100 (shown in FIG. 1). In an alternative embodiment, referring to FIG. 1, pump assembly 100 includes a drive shaft coupled to shaft 208 and motor 210 is omitted from centrifugal separator 124. As such, centrifugal separator 124 is actuated by rotation of shaft 208.

As such, in operation, mixed stream 234 enters outer tube 202 and inner tube 204 through outer tube inlet 214 and inner tube inlet 220. Mixed stream 234 is channeled from outer tube inlet 214 and inner tube inlet 220 towards outer tube outlet 216 and inner tube outlet 222 as motor 210 and shaft 208 rotates inner tube 204. In addition, mixed stream 234 is separated based on a density of the second fluid and the third fluid. For example, the second fluid, which has a greater density than the third fluid, is forced radially outward as inner tube 204 rotates and a centrifugal force is formed. As such, the percentage of the second fluid in the fluid channeled within a radially outer portion 240 of inner tube 204 progressively increases from inner tube inlet 220 towards inner tube outlet 222, thereby forming purified stream 236 of second fluid for discharge from outer tube outlet 216. Radially outer portion 240 of inner tube 204 includes the volume of inner tube 204 outside of dashed lines 242. A radially inner portion 244 of inner tube 204 includes the volume of inner tube 204 inside of dashed lines 242.

Moreover, the third fluid within mixed stream 234 is displaced from radially outer portion 240 of inner tube 204 into radially inner portion 244 of inner tube 204 as inner tube 204 rotates. As such, the percentage of the third fluid in the fluid channeled within radially inner portion 244 of inner tube 204 progressively increases from inner tube inlet 220 towards inner tube outlet 222, thereby forming purified stream 238 of third fluid for discharge from outlet pipe outlet 228.

As illustrated in FIG. 3, control mechanism 300 includes a plurality of springs 302 and a plurality of plates 304. Plates 304 are positioned within outlet pipe inlet 226 of outlet pipe 206 and are configured to expand or contract a cross-sectional area of outlet pipe inlet 226. Springs 302 are coupled to outer tube 202 and plates 304. Springs 302 extend through outlet pipe 206. Springs 302 are configured to react to a pressure difference between a pressure of purified stream 238 and a pressure of purified stream 236. When production fluids are not present, springs 302 pull plates 304 toward outer tube 202 and increase the cross-sectional area of outlet pipe inlet 226. The presences of production fluids within centrifugal separator 124 changes the pressure difference and the cross-sectional area of outlet pipe inlet 226.

During operations, outlet pipe 206 channels purified stream 238 of the third fluid out of centrifugal separator 124. As the content of the third fluid in mixed stream 234 increases, the volume of third fluid that outlet pipe 206 channels out of centrifugal separator 124 also increases. As such, the pressure of purified stream 238 relative to the pressure of purified stream 236 decreases. The pressure difference increases, and, as the pressure difference increases, plates 304 exert a force on springs 302 and increase the cross-sectional area of outlet pipe inlet 226. This facilitates more purified stream 238 into outlet pipe 206.

Conversely, as the content of the third fluid in mixed stream 234 decreases, the volume of third fluid that outlet pipe 206 channels out of centrifugal separator 124 also decreases. As such, the pressure of purified stream 238 relative to the pressure of purified stream 236 increases. The pressure difference decreases, and, as the pressure difference decreases, plates 304 exerts less force on springs 302 and decrease the cross-sectional area of outlet pipe inlet 226. This facilitates less purified stream 238 into outlet pipe 206. In the exemplary embodiment, purified stream 238 includes between about 40% to about 60% oil and between about 60% to about 40% water. Purified stream 236 includes about 99% to about 99.99% water and about 100 to about 10,000 parts-per-million (ppm) oil.

The pressure of purified stream 238 is set by pump system 100 and the pressure of purified stream 236 is set by the pressure of the disposal zone. As used herein, the phrase "disposal zone" includes a dedicated disposal zone for receiving the discharged purified stream 236. The disposal zone may lie either above or below outer tube inlet 214, i.e., a producing zone. The disposal zone enables downhole disposal of purified stream 236, which facilitates reducing energy needed to pump purified stream 236 to the surface. Because the disposal zone contains a liquid, such as water and is downhole, the disposal zone will have some pressure associated with it. As such, the pressure of purified stream 236 is set by the pressure of the disposal zone. Thus, when the hydrostatic head in the tubing is great enough, purified stream 236 drains into the disposal zone. As the volume of third fluid within purified stream 238 increases, the suction of pump system 100 also increases to pump more purified stream 238. This decreases the pressure of purified stream 238 within outlet pipe 206. As such, control mechanism 300 automatically reacts to changing composition of mixed stream 234 without increasing the amount of control equipment in centrifugal separator 124. Thus, as the amount of oil in a well decreases, control mechanism 300 automatically decreases the amount of purified stream 238 sent to surface 110. Additionally, control mechanism 300 improves the quality of purified stream 238 by reducing the amount of the second fluid included in purified stream 238.

Figure 4:
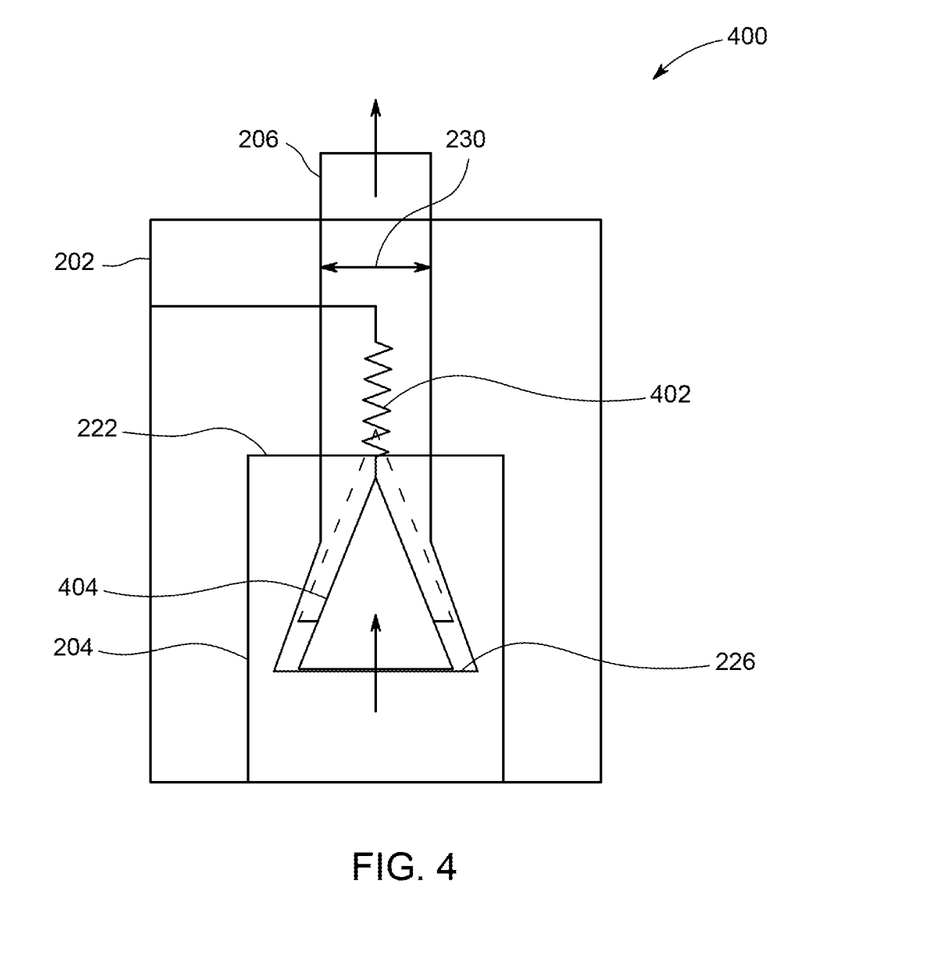
FIG. 4 is a schematic view of an alternative control mechanism that may be used with the centrifugal downhole oil-water separation system shown in FIG. 2.

FIG. 4 is a schematic view of an alternative control mechanism 400 that may be used with centrifugal separator 124. In the exemplary embodiment, control mechanism 400 is a conical vale and includes at least one spring 402 and a conical valve seat 404. Conical valve seat 404 is positioned within outlet pipe inlet 226 of outlet pipe 206 and is configured to move axially to expand or contract a cross-sectional area of outlet pipe inlet 226. Spring 402 is coupled to outer tube 202 and conical valve seat 404. Spring 402 is configured to react to a pressure difference between a pressure of purified stream 238 and a pressure of purified stream 236 (shown in FIG. 2). When production fluids are not present, spring 402 pushes conical valve seat 404 away from outlet pipe inlet 226 to increase the cross-sectional area of outlet pipe inlet 226. The presences of production fluids within centrifugal separator 124 (shown in FIG. 2) changes the pressure difference and the cross-sectional area of outlet pipe inlet 226.

Figure 5:
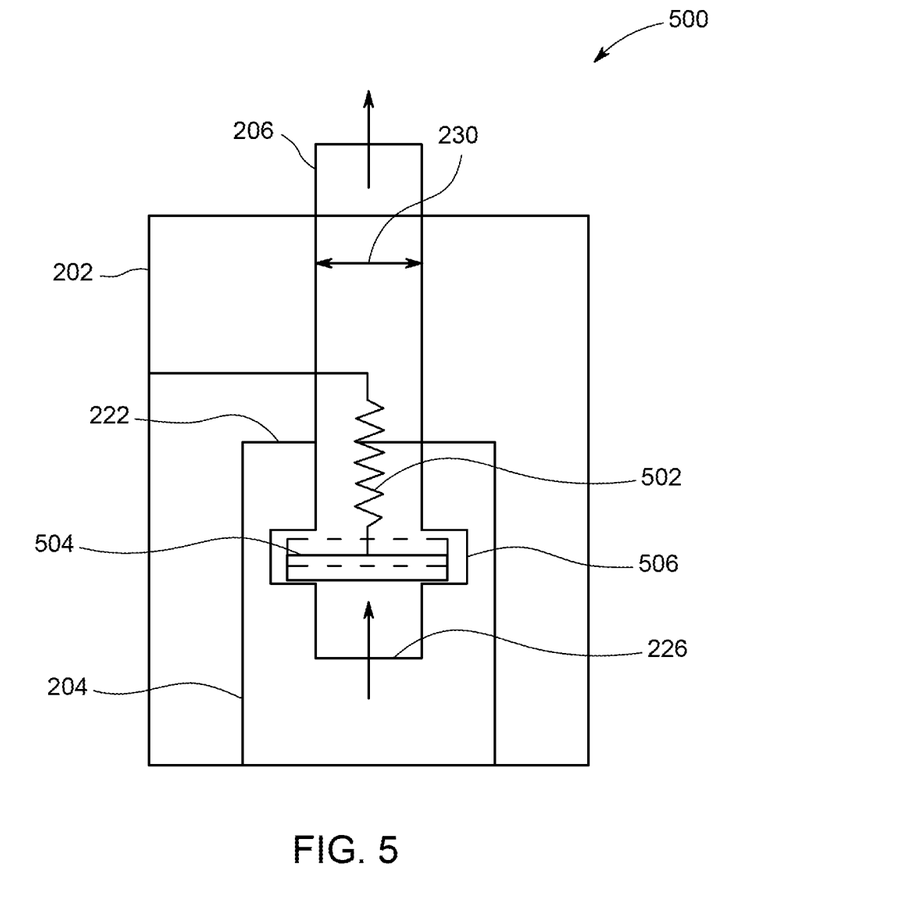
FIG. 5 is a schematic view of yet another alternative control mechanism that may be used with the centrifugal downhole oil-water separation system shown in FIG. 2.

FIG. 5 is a schematic view of yet another alternative control mechanism 500 that may be used with centrifugal separator 124. In the exemplary embodiment, control mechanism 500 is a plunger type vale and includes at least one spring 502 and a plunger valve seat 504. Plunger valve seat 504 is positioned within a valve seat cavity 506 formed proximate outlet pipe inlet 226 of outlet pipe 206 and is configured to move axially to expand or contract a cross-sectional area of outlet pipe inlet 226. Spring 502 is coupled to outer tube 202 and plunger valve seat 504. Spring 502 is configured to react to a pressure difference between a pressure of purified stream 238 and a pressure of purified stream 236 (shown in FIG. 2). When production fluids are not present, spring 502 applies a force to plunger valve seat 504 to open the valve and increase the cross-sectional area of outlet pipe inlet 226. The presences of production fluids within centrifugal separator 124 (shown in FIG. 2) changes the pressure difference and the cross-sectional area of outlet pipe inlet 226.

The centrifugal separator described herein facilitates separating a mixed stream of fluid in an efficient manner. The centrifugal separator includes a control mechanism within the centrifugal separator. The control mechanism enables the centrifugal separator to adapt automatically to the changing composition of the mixed stream. In addition, the quality of the produced fluid sent to the surface is improved because less water is sent to the surface.

An exemplary technical effect of the device and methods described herein includes at least one of: (a) separating a mixture including at least two fluids having different densities; (b) providing a control mechanism capable of controlling the centrifugal separator; and (c) providing a control mechanism capable of automatically adapting to the changing composition of a well.

Exemplary embodiments of a centrifugal separator are provided herein. The devices and methods are not limited to the specific embodiments described herein, but rather, components of systems and/or steps of the methods may be utilized independently and separately from other components and/or steps described herein. For example, the configuration of components described herein may also be used in combination with other processes, and is not limited to practice with only separating oil and water mixtures, as described herein. Rather, the exemplary embodiment can be implemented and utilized in connection with many applications where separating a mixture into its component parts is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A centrifugal separator comprising:
   an outer tube defining at least one outer tube inlet for a first fluid and at least one outer tube outlet for a second fluid, said at least one outer tube inlet configured to channel a flow of the first fluid into said outer tube, said at least one outer tube outlet configured to channel a flow of the second fluid out of said outer tube;
   an inner tube disposed within said outer tube such that said outer tube circumscribes said inner tube, said inner tube configured to separate the flow of the first fluid into the flow of the second fluid and a flow of a third fluid by rotation thereof;
   an outlet pipe partially disposed within said inner tube and said outer tube such that said inner tube and said outer tube partially circumscribe said outlet pipe, said outlet pipe having a cross-sectional area, said outlet pipe configured to channel the flow of the third fluid out of said inner tube and said outer tube; and
   a control mechanism coupled to said outlet pipe, wherein said control mechanism is configured to regulate the flow of the third fluid by changing the cross-sectional area of said outlet pipe, wherein the flow of the second fluid has a second fluid pressure, the flow of the third fluid has a third fluid pressure, wherein said control mechanism is configured to control the change to the cross-sectional area of said outlet pipe in response to a pressure difference between the second fluid pressure and the third fluid pressure.

2. The centrifugal separator in accordance with claim 1, wherein said control mechanism comprises at least one spring coupled to said outlet pipe and said outer tube, wherein said at least one spring is configured to control the flow of the third fluid by changing the cross-sectional area of said outlet pipe.

3. The centrifugal separator in accordance with claim 2, wherein said control mechanism further comprises a plurality of plates disposed within said outlet pipe, said at least one spring comprising a plurality of springs coupled to said plurality of plates and said outer tube, wherein said plurality of springs are configured to change the cross-sectional area of said outlet pipe by inducing a force on said plurality of plates.

4. The centrifugal separator in accordance with claim 2, wherein said control mechanism further comprises one of a conical valve seat and a plunger valve seat, said at least one spring coupled to said one of a conical valve seat and a plunger valve seat.

5. The centrifugal separator in accordance with claim 1, wherein the flow of the first fluid has a first fluid pressure, and wherein the second fluid pressure is determined at least partially by a disposal zone pressure.

6. The centrifugal separator in accordance with claim 1 further comprising a motor coupled to said inner tube, said motor configured to rotate said inner tube.

7. The centrifugal separator in accordance with claim 1 further comprising a production fluid diverter disposed within said outer tube, said production fluid diverter circumscribing said inner tube, wherein said production fluid diverter is configured to channel the flow of the first fluid into said inner tube.

8. A pumping system comprising:
   a pump configured to induce a flow of a first fluid out of a well bore; and
   a centrifugal separator coupled in flow communication with said pump, said centrifugal separator comprising:

an outer tube defining at least one outer tube inlet for a first fluid and at least one outer tube outlet for a second fluid, said at least one outer tube inlet configured to channel the flow of the first fluid into said outer tube, the flow of the first fluid has a first fluid pressure, said at least one outer tube outlet configured to channel a flow of the second fluid out of said outer tube, the flow of the second fluid has a second fluid pressure;

an inner tube disposed within said outer tube such that said outer tube circumscribes said inner tube, said inner tube configured to separate the flow of the first fluid into the flow of the second fluid and a flow of a third fluid by rotation thereof;

an outlet pipe partially disposed within said inner tube and said outer tube such that said inner tube and said outer tube partially circumscribe said outlet pipe, said outlet pipe having a cross-sectional area, said outlet pipe configured to channel the flow of the third fluid out of said inner tube and said outer tube; and a control mechanism coupled to said outlet pipe, wherein said control mechanism is configured to regulate the flow of the third fluid by changing the cross-sectional area of said outlet pipe, wherein said control mechanism comprises at least one spring coupled to said outlet pipe and said outer tube, wherein said at least one spring is configured to control the flow of the third fluid by changing the cross-sectional area of said outlet pipe.

9. The pumping system in accordance with claim 8, wherein said control mechanism further comprises a plurality of plates disposed within said outlet pipe, said at least one spring comprising a plurality of springs coupled to said plurality of plates and said outer tube, wherein said plurality of springs are configured to change the cross-sectional area of said outlet pipe by inducing a force on said plurality of plates.

10. The pumping system in accordance with claim 8, wherein said control mechanism further comprises one of a conical valve seat and a plunger valve seat, said at least one spring coupled to said one of a conical valve seat and a plunger valve seat.

11. The pumping system in accordance with claim 8, wherein the flow of the third fluid has a third fluid pressure, wherein said control mechanism is configured to control the change to the cross-sectional area of said outlet pipe in response to a pressure difference between the second fluid pressure and the third fluid pressure.

12. The pumping system in accordance with claim 11, wherein the second fluid pressure is determined at least partially by a disposal zone pressure, and wherein the third fluid pressure is determined at least partially by said pump.

13. The pumping system in accordance with claim 8 further comprising a motor coupled to said inner tube, said motor configured to rotate said inner tube.

14. The pumping system in accordance with claim 8 further comprising a production fluid diverter disposed within said outer tube, said production fluid diverter circumscribing said inner tube, wherein said production fluid diverter is configured to channel the flow of the first fluid into said inner tube.

15. A method of controlling a centrifugal separator, the centrifugal separator including an outer tube, an inner tube, an outlet pipe, and a control mechanism, the inner tube disposed within the outer tube, the outer tube defining at least one outer tube outlet, the inner tube configured to separate a flow of a first fluid into a flow of a second fluid and a flow of a third fluid by rotating, the outlet pipe including a cross-sectional area, the outlet pipe configured to channel the flow of third out of the inner tube and the outer tube, the control mechanism coupled to the outlet pipe, said method comprising:

receiving the flow of the first fluid by the inner tube;

rotating the inner tube to separate the flow of the first fluid into a flow of the second fluid and a flow of the third fluid;

channeling the flow of the second fluid into the at least one outer tube outlet;

channeling the flow of the third fluid into the outlet pipe; and changing the cross-sectional area of the outlet pipe with the control mechanism, wherein changing the cross-sectional area of the outlet pipe regulates the flow of the third fluid into the outlet pipe, wherein changing the cross-sectional area of the outlet pipe with the control mechanism comprises changing the cross-sectional area of the outlet pipe with a plurality of springs and a plurality of plates, the plurality of plates positioned within the outlet pipe, the plurality of springs configured to change the cross-sectional area of the outlet pipe by inducing a force on the plurality of plates.

16. The method in accordance with claim 15, wherein changing the cross-sectional area of the outlet pipe with the control mechanism comprises changing the cross-sectional area of the outlet pipe with a spring coupled to one of a conical valve seat and a plunger valve seat, the one of the conical valve seat and the plunger valve seat positioned within the outlet pipe, the spring configured to change the cross-sectional area of the outlet pipe by inducing a force on the one of the conical valve seat and the plunger valve seat.

17. The method in accordance with claim 15, wherein rotating the inner tube to separate the flow of the first fluid into a flow of a second fluid and a flow of a third fluid comprises rotating the inner tube with a motor to separate the flow of the first fluid into the flow of the second fluid and the flow of the third fluid.

* * * * *